United States Patent [19]

Yamadaya et al.

[11] 4,069,303
[45] Jan. 17, 1978

[54] ALLOY USEFUL AS HYDROGEN STORAGE MATERIAL

[75] Inventors: Tokio Yamadaya; Yasuhiko Machida, both of Kawasaki, Japan

[73] Assignee: Matsushita Electric Industrial Company, Japan

[21] Appl. No.: 769,952

[22] Filed: Feb. 18, 1977

[30] Foreign Application Priority Data

Feb. 20, 1976 Japan .................... 51-18125

[51] Int. Cl.² .................................. C01B 6/02
[52] U.S. Cl. .................... 423/644; 75/134 F; 75/134 M; 75/134 N; 75/175.5; 75/177
[58] Field of Search ............ 75/134 F, 134 M, 134 N, 75/175.5, 176, 177; 423/644, 645

[56] References Cited

U.S. PATENT DOCUMENTS

| | | | |
|---|---|---|---|
| 2,974,076 | 3/1961 | Vordahl | 75/175.5 |
| 3,532,559 | 10/1970 | Gullotti | 75/175.5 |
| 3,644,153 | 2/1972 | Rausch et al. | 75/134 F |
| 3,645,727 | 2/1972 | Finlay | 75/176 |

FOREIGN PATENT DOCUMENTS

| | | | |
|---|---|---|---|
| 587,580 | 11/1959 | Canada | 75/175.5 |
| 796,781 | 6/1958 | United Kingdom | 75/175.5 |
| 785,293 | 10/1957 | United Kingdom | 75/175.5 |

OTHER PUBLICATIONS

Hayes, E. T., et al. "Zirconium–Chromium Phase Diagram", Journal of Metals, (Mar., 1952), pp. 304–305.

*Primary Examiner*—L. Dewayne Rutledge
*Assistant Examiner*—Michael L. Lewis
*Attorney, Agent, or Firm*—Lowe, King, Price & Markva

[57] ABSTRACT

An alloy represented by the general formula $Ti_{x-y}Zr_yCr_{2-z}Mn_z$, where $1 \leq x \leq 1.3$, $0 < y \leq 1$, and $0 < z < 2$. This alloy readily forms complex metal hydrides at low hydrogen pressures and can absorb a large quantity of hydrogen. The absorbed hydrogen can readily be liberated at room temperature.

4 Claims, 3 Drawing Figures

ALLOY USEFUL AS HYDROGEN STORAGE MATERIAL

This invention relates to a novel titanium-zirconium-chromium-manganese alloy which readily gives complex metal hydrides useful as reservoirs for hydrogen.

It is well known that numerous metals and alloys can absorb and store prodigious quantities of hydrogen by forming metal hydrides. Most of these metals and alloys, however, substantially absorb and liberate hydrogen only at considerably high temperatures. To utilize a hydride-forming metal or alloy as a practical reservoir for hydrogen, it is desired that both the absorption and liberation of hydrogen be efficiently accomplished at relatively low temperatures, most preferably at room temperature.

As noteworthy fruits of recent researches, LaNi$_5$ and FeTi have been proposed respectively by PHILIPS and Brookhaven National Laboratory as alloys capable of absorbing hydrogen (forming complex metal hydrides) and liberating it nearly at room temperature under several atmospheric pressures. However, LaNi$_5$ is estimated to be too costly to be of industrial use because of comprising lanthanum. FeTi will be provided as a cheap material but has the disadvantage that this alloy needs to initially be activated by a complicated process to serve as an efficient hydrogen storage material.

It is an object of the present invention to provide a novel alloy, which is less costly than LaNi$_5$ and can absorb and liberate hydrogen in large quantities, through the formation and dissociation of complex metal hydrides, at room temperature without any particular process for initial activation.

An alloy according to the invention is a quaternary alloy represented by the general formula $$Ti_{x-y}Zr_yCr_{2-z}Mn_z$$

where

This alloy is a hexagonal system and can absorb hydrogen in large quantities by forming complex metal hydrides. The absorption of hydrogen can be realized by simply leaving the alloy in several atmospheric pressures of hydrogen at or around room temperature. The resultant hydrides can efficiently liberate hydrogen at or around room temperature. This alloy is comparable with LaNi$_5$ and FeTi in the ability of storing hydrogen but distinctly cheaper than LaNi$_5$ and advantageous over FeTi in needing no particular process for initial activation. Accordingly the alloy of the invention is quite useful as a practical storage material for hydrogen.

The invention will fully be understood from the following detailed description with reference to the accompanying drawings, wherein.

Figure 1:
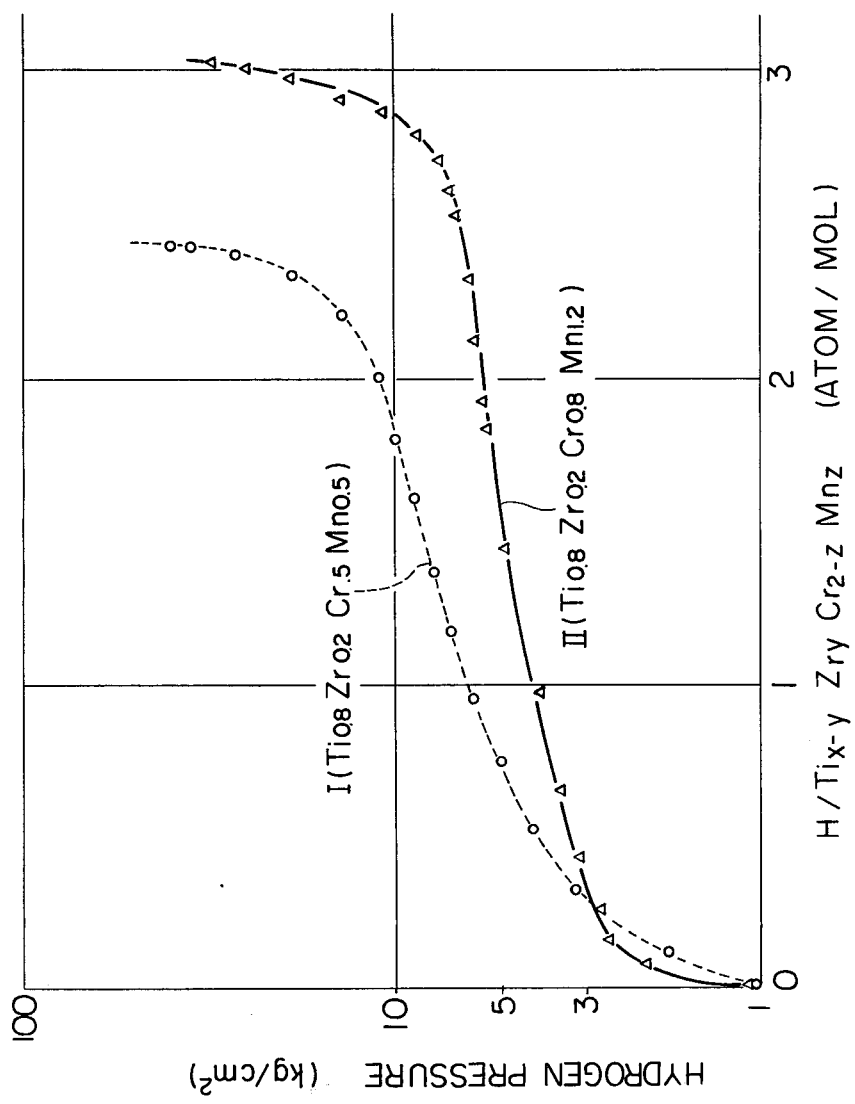
FIG. 1 is a pressure-composition isotherm showing examples of the hydrogen absorption ability of the alloy according to the invention.

An alloy which serves as a hydrogen reservoir forms complex metal halides in a pressurized hydrogen gas atmosphere. Hydrogen merely dissolves in the alloy while the hydrogen pressure applied to the alloy is low, so that the quantity of the dissolved hydrogen increases as the hydrogen pressure is increased. However, a metal hydride phase appears in the alloy when the hydrogen pressure reaches a value specific to the alloy. Then the quantity of hydrogen absorbed by the alloy continuously increases until the alloy phase entirely turns into the hydride phase even though the hydrogen pressure is not raised beyond the specific pressure. A hydrogen pressure region in which the alloy can absorb a variable quantity of hydrogen while the hydrogen pressure remains roughly constant is commonly called "plateau region". In the present application, the term "equilibrium hydrogen pressure" (represented by $P_P$) means an approximately average hydrogen pressure in a plateau region.

An alloy according to the invention is a quaternary alloy consisting of Ti, Zr, Cr and Mn. Some binary alloys of these elements such as TiCr$_2$, TiMn$_{1.5}$, ZrCr$_2$ and ZrMn$_2$ are known to form metal hydrides. However, substantially no plateau region exists for these binary systems at temperatures convenient to practical applications. From this reason, these binary alloys are not of practical use as hydrogen storage materials. Nevertheless, we have discovered that the described quaternary system exhibits a plateau region so long as the composition of the system is as specified hereinbefore. From a practical point of view, it is preferred that the value of y(Zr) in the above presented general formula is at least 0.1, more preferably at least 0.2, and that the value of z(Mn) is from 0.3 to 1.5.

"Initial activation" of an alloy as a hydrogen storage material refers to a process of reacting the alloy with hydrogen to initiate the formation of metal hydride phase in the alloy. Once the alloy is activated, the formation of metal hydride phase readily proceeds merely by application of a hydrogen gas pressure corresponding to or slightly above an equilibrium hydrogen pressure. However, an alloy according to the invention needs no activation process other than the application of an equilibrium hydrogen pressure. The metal hydride retains hydrogen so long as it is kept under a hydrogen pressure not lower than the equilibrium pressure. The hydrogen in the metal hydride phase readily comes out as hydrogen gas when the environmental hydrogen pressure is made below the equilibrium pressure.

The preparation and hydrogen-absorbing property of the quaternary system according to the invention will be illustrated by the following nonlimitative examples.

Throughout the examples, commercially available sponge titanium, sponge zirconium, electrolytic chromium and electrolytic manganese were used as raw materials,

EXAMPLE 1

To prepare a quaternary alloy represented by the formula Ti$_{0.8}$Zr$_{0.2}$Cr$_{1.5}$Mn$_{0.5}$ ($x = 1.0$, $y = 0.2$ and $z = 0.5$ in the general formula Ti$_{x-y}$Zr$_y$Cr$_{2-z}$Mn$_z$), the four metals weighed in the following quantities were melted in an argon arc furnace.

| Ti | 3.83g | (0.08 mol) |
|---|---|---|
| Zr | 1.82g | (0.02 mol) |
| Cr | 7.80g | (0.15 mol) |
| Mn | 2.75g | (0.05 mol) |

The melting operation was repeated several times until a thoroughly homogenized quaternary alloy was given.

The resultant $Ti_{0.8}Zr_{0.2}Cr_{1.5}Mn_{0.5}$ system was a very brittle alloy and could readily be pulverized by mechanical means.

This alloy was pulverized to a particle size of about 0.3 mm and placed in a stainless steel reaction vessel. The vessel was evacuated and subsequently charged with hydrogen gas to a pressure of about 15 kg/cm$^2$. The vessel was kept at room temperature. Immediately the alloy began to violently react with hydrogen and turned into a complex metal hydride in a short time. Then the hydrogen pressure in the vessel was relieved to allow the hydride phase in the alloy to liberate hydrogen. The pressurizing and the pressure relief were cycled several times. The formation of hydride phase caused the powdered alloy to further break down and exhibit an increase in the total surface area, so that the rate of the reaction with hydrogen gradually enhanced as the pressurizing and pressure relief were repeated. However, the reaction rate reached maximal and nearly constant after the repetition of 5–6 cycles.

Then the hydrogen-absorbing ability of this alloy was quantitatively examined as the function of the applied hydrogen pressure. The alloy was allowed to absorb hydrogen to a full extent at a preset hydrogen pressure, and thereafter hydrogen gas was intermittently discharged from the vessel each time in a definite volume to measure a resultant pressure change in the vessel. It was found that this alloy could absorb and store 165.5 ml/g of hydrogen when the applied hydrogen pressure was 15 kg/cm$^2$. The equilibrium hydrogen pressure $P_P$ for this alloy at room temperature was about 7 kg/cm$^2$. The relationship between the hydrogen pressure applied to this alloy at room temperature and the quantity of hydrogen absorbed in the alloy is presented in FIG. 1 by the curve I. As seen, a plateau region (about 6–8 kg/cm$^2$) exists for this alloy. In this region, it is possible to make the alloy absorb or liberate a large quantity of hydrogen at room temperature by only slightly varying the hydrogen pressure. This is a great advantage of the alloy from a practical viewpoint.

The repeated application of the hydrogen pressure of 15 kg/cm$^2$ was carried out merely for raising the rate of the hydride-forming reaction. The alloy could absorb hydrogen according to the curve I of FIG. 1 readily enough to serve as a practical hydrogen storage material even when tested without initially applying a high hydrogen pressure such as 15 kg/cm$^2$.

EXAMPLE 2

This example relates to $Ti_{0.8}Zr_{0.2}Cr_{0.8}Mn_{1.2}$ ($x = 1.0$, $y = 0.2$ and $z = 1.2$).

This alloy was prepared by the method described in Example 1. The alloy readily turned into a complex metal hydride when subjected to the hydrogen absorption process according to Example 1.

The equilibrium hydrogen pressure for this alloy was about 5 kg/cm$^2$. The hydrogen-absorbing ability of this alloy as the function of the hydrogen pressure was found as represented by the curve II in FIG. 1. The alloy of Example 2 is advantageous over the alloy of Example 1 both in the width of the plateau region (about 3–8 kg/cm$^2$ for the alloy of Example 2) and hydrogen-absorbing ability at almost every pressure. The alloy of Example 2 absorbed more than 200 ml/g of hydrogen at 15 kg/cm$^2$.

EXAMPLES 3–13

Supplementally, variously composed alloys were prepared as shown in the following table and examined by the procedures of Example 1.

| Ex. No. | Composition | $P_P$ (kg/cm$^2$) |
|---|---|---|
| 3 | $Ti_{0.8}Zr_{0.2}Cr_{1.7}Mn_{0.3}$ | 5 |
|   | $Ti_{0.8}Zr_{0.2}Cr_{1.5}Mn_{0.5}$ (Ex. 1) |   |
| 4 | $Ti_{0.8}Zr_{0.2}Cr_{1.3}Mn_{0.7}$ | 4.8 |
| 5 | $Ti_{0.8}Zr_{0.2}Cr_{1.0}Mn_{1.0}$ | 8 |
|   | $Ti_{0.8}Zr_{0.2}Cr_{0.8}Mn_{1.2}$ (Ex. 2) | 5 |
| 6 | $Ti_{0.8}Zr_{0.2}Cr_{0.5}Mn_{1.5}$ | 5.5 |
| 7 | $Ti_{0.7}Zr_{0.3}Cr_{1.5}Mn_{0.5}$ | 2 |
| 8 | $Ti_{0.8}Zr_{0.2}Cr_{1.5}Mn_{0.5}$ | 7 |
| 9 | $Ti_{0.9}Zr_{0.1}Cr_{1.5}Mn_{0.5}$ | 19 |
| 10 | $Ti_{1.0}Zr_{0.2}Cr_{0.8}Mn_{1.2}$ | 6 |
| 11 | $Ti_{0.6}Zr_{0.4}Cr_{1.5}Mn_{0.5}$ | 0.8 |
| 12 | $Ti_{0.5}Zr_{0.5}Cr_{1.5}Mn_{0.5}$ | 0.3 |
| 13 | $Ti_{0.4}Zr_{0.6}Cr_{1.5}Mn_{0.5}$ | 0.2 |

Figure 2:
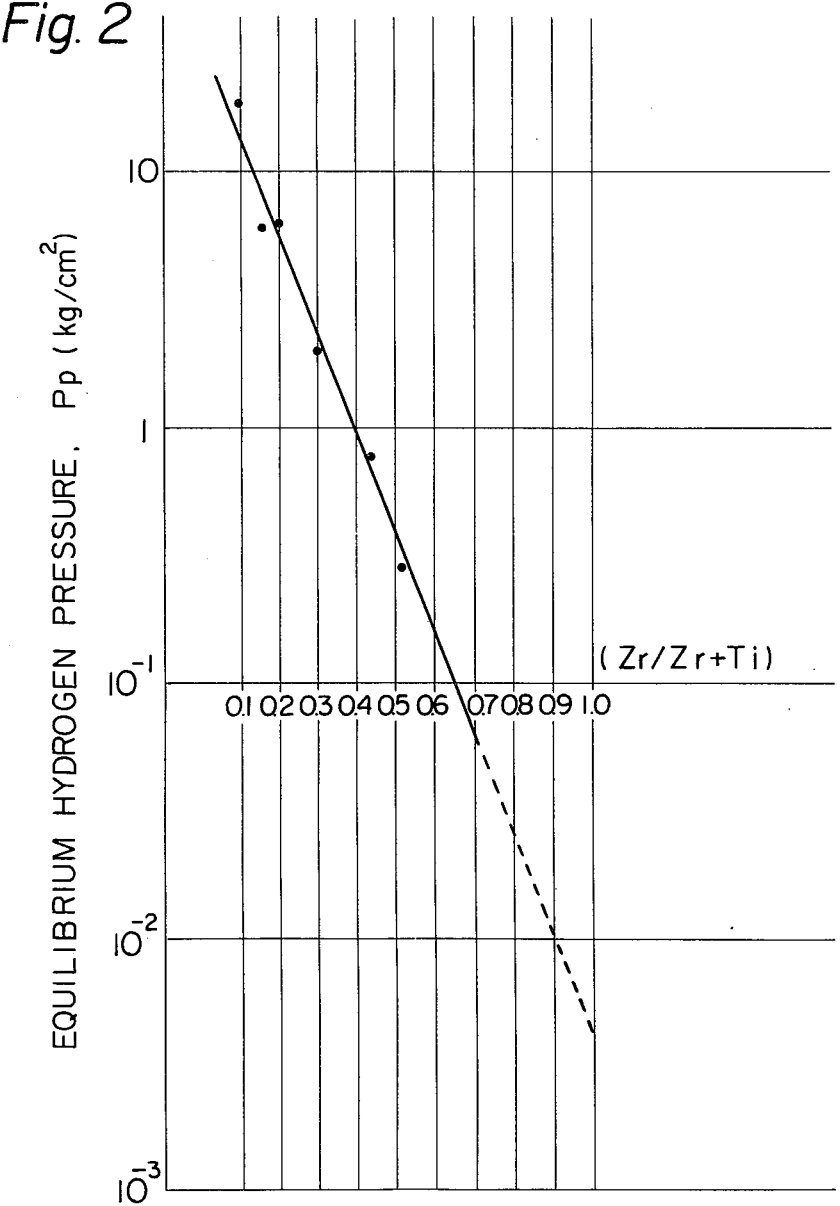
FIG. 2 is a graph showing the dependence of an equilibrium hydrogen pressure for an alloy according to the invention on the amount of zirconium in alloy.

This table implies that the equilibrium hydrogen pressure for the quaternary alloy according to the invention significantly depends on the ratio of Zr to Ti in the alloy. FIG. 2 shows an experimentally confirmed relationship between the amount of Zr relative to Ti and the equilibrium hydrogen pressure $P_p$ on $Ti_{x-y}Zr_yCr_{1.5}Mn_{0.5}$. It is apparent that the equilibrium hydrogen pressure $P_P$ can be lowered by increasing the amount of Zr in the quaternatary alloy.

Figure 3:
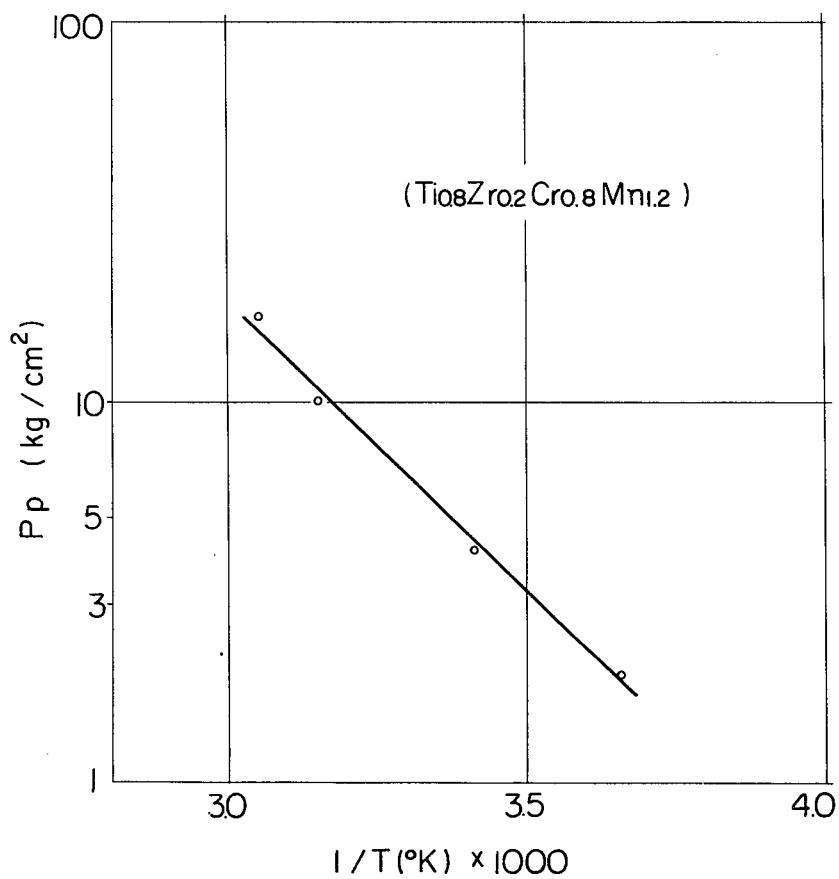
FIG. 3 is a graph showing the dependence of the aforementioned equilibrium hydrogen pressure on temperature.

The equilibrium hydrogen pressure for the alloy according to the invention has a certain dependency on temperature too. For the alloy of Example 2, the variation of the equilibrium hydrogen pressure $P_P$ as the function of temperature was as shown in FIG. 3.

What is claimed is:

1. A quaternary alloy which can store hydrogen by forming complex metal hydrides and is represented by the general formula $$Ti_{x-y}Zr_yCr_{2-z}Mn_z$$

where $1 \leq x \leq 1.3$, $0 < y \leq 1$, and $0 < z < 2$.

2. An alloy as claimed in claim 1, wherein $$0.1 \leq y \leq 1, \text{ and } 0.3 \leq z \leq 1.5.$$

3. A alloy as claimed in claim 2, wherein $0.2 \leq y \leq 1$.

4. A complex metal hydride useful as a hydrogen reservoir formed by reaction of hydrogen gas with a quaternary alloy represented by the general formula $$Ti_{x-y}Zr_yCr_{2-z}Mn_z$$

where $1 \leq x \leq 1.3$, $0 < y \leq 1$, and $0 < z < 2$.

* * * * *